Dec. 30, 1947.  F. M. POOLE  2,433,577
REMOTE MOTION REPRODUCING MEANS
Filed July 14, 1944  2 Sheets-Sheet 1

Foster M. Poole,
Inventor.
Haynes and Koenig,
Attorneys

Dec. 30, 1947.  F. M. POOLE  2,433,577
REMOTE MOTION REPRODUCING MEANS
Filed July 14, 1944   2 Sheets-Sheet 2
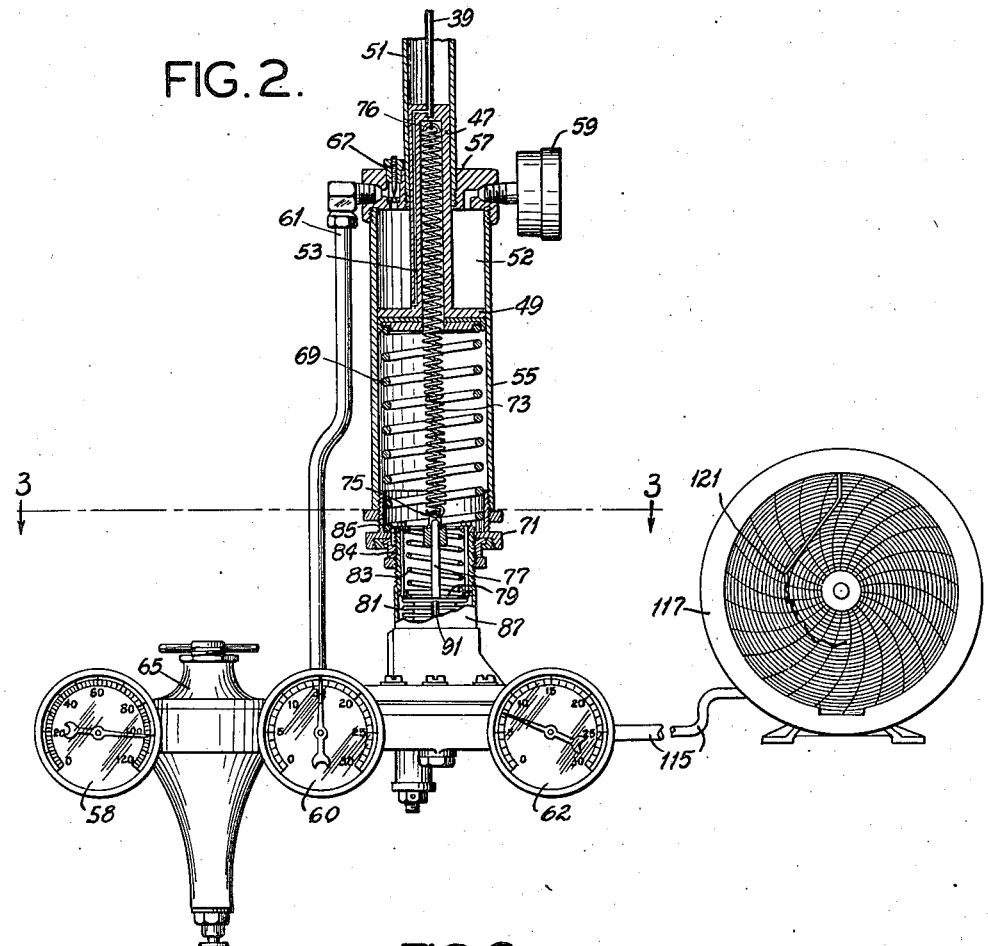
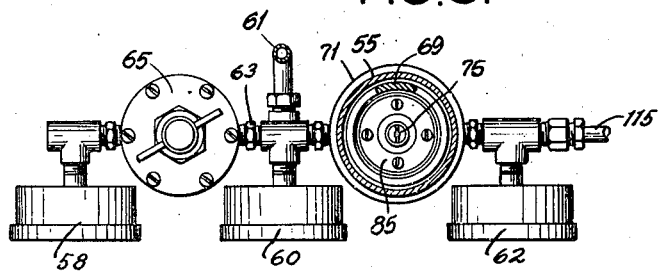

Patented Dec. 30, 1947

2,433,577

UNITED STATES PATENT OFFICE 2,433,577

REMOTE MOTION REPRODUCING MEANS

Foster M. Poole, Dallas, Tex.

Application July 14, 1944, Serial No. 544,946

12 Claims. (Cl. 73—209)

This invention relates to remote means for exteriorly proportionately reproducing a sequence of positions of a primary device which is movable in a closed container, and with regard to certain more specific features, to mechanical remote-reading fluid flow meters or liquid level devices.

Among the several objects of the invention may be noted the provision of said remote means for exteriorly proportionately reproducing a sequence of positions of a primary device which is movable in a closed vessel, without the use of packing glands or seals engaging any movable part passing through the vessel; the provision of an accurate mechanical meter of the float type with which remote indications of float levels may be obtained and hence of the quantities represented by the float levels, as for example rate of flow in the case of a so-called "rotameter" flow meter; the provision of apparatus of the class described which sensitively enough, but without substantial hunting, responds to a float level change without substantially resisting that change; the provision in apparatus of the class described of a mechanical detector and transmitter means for determining and indicating float positions without any substantial interference from friction and without leakage difficulties; and the provision of a device of the class described which is simple, safe and reliable, requiring no electrical connections which are a hazard in many applications such as in the oil field equipment. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a vertical section showing certain flow meter and transmitter components of the invention;

Fig. 2 is a vertical section showing said transmitter components and pilot valve relay components of the invention;

Fig. 3 is a horizontal section taken on line 3—3 of Fig. 2; and,

Similar reference characters indicate corresponding parts throughout the several views of the drawings.

Figure 1:
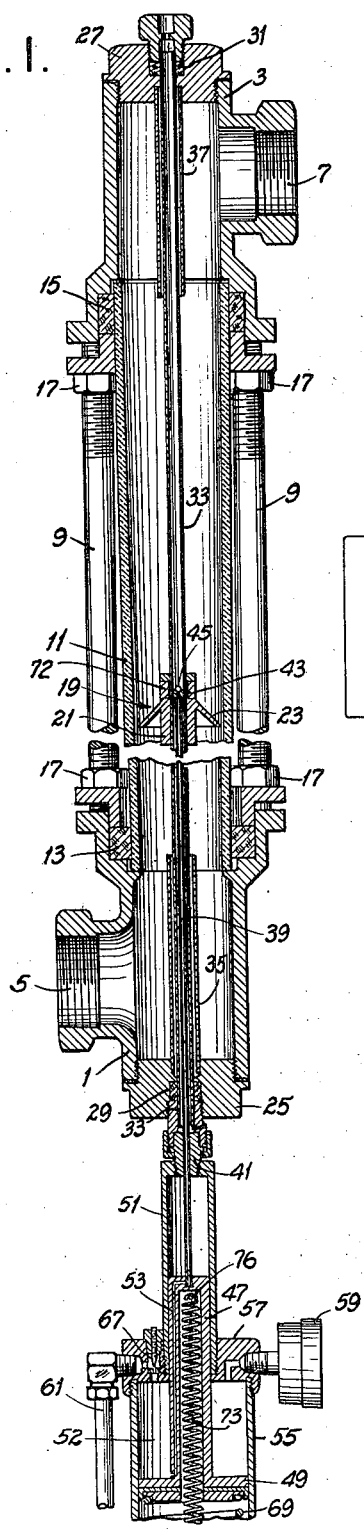

Referring now more particularly to Fig. 1, numeral 1 indicates a lower header and 3 an upper header of a flow meter unit. Header 1 has an inlet 5 and header 3 an outlet 7 for connection into a fluid line, the flow in which is to be measured. The headers 1 and 3 are joined by spacing pillars 9. Between the headers is located a conical tube 11 having its small end downward and attached to header 1 by means of a stuffing box 13. The larger upper end of the tube 11 is held to the upper header 3 by means of a stuffing box 15. The glands of stuffing boxes 13 and 15 are adjusted by means of nuts 17 carried on the spacing pillars 9.

At numeral 19 is shown in general a float having a main body portion 21 and a vane 23.

The elements thus far described operate in the line of flow being measured by admitting fluid at the inlet 5 and discharging it at 7. The fluid in passing through the tube 11 tends to move the float 19 upward. The specific gravity of the float is greater than that of the fluid being measured so that it tends to sink down, but it is pushed up by the force of the fluid rushing through the tube 11 and around the vane, until a point is reached along the taper of said tube 11 that the clearance between the float and the tube wall involves an upward force which equilibrates the float. There is a point of equilibrium of the float for each rate of flow through the tube 11. The greater the flow, the higher will be the point of equilibrium and vice versa.

The position of the float 19 is visible if the tube 11 is made of a transparent material such as glass. The glass may be calibrated in units of volume per unit of time (gallons per minute for example). This is usually the case but a disadvantage of the construction is that its readings can only be taken at the location of the flow meter parts per se. The present invention provides means for transmitting to a distant instrument information regarding the location of the float and continuously recording it. The distant instrument is calibrated in terms of the flow through the flow meter parts.

Heads 25 and 27 attached respectively to the headers 1 and 3 carry stuffing boxes 29 and 31 respectively. These hold in place, without leakage, a guide tube 33. Around the guide tube, adjacent the heads 25 and 27 are tubular stops 35 and 37 respectively threaded into the heads 25 and 27. The float 19 is made cylindric and slides freely on the tube 33. It is limited in its vertical motions by the stops 35 and 37.

Passing loosely through the tube 33 is an inner tube 39. The tube 39 freely slides in tube 33 and emerges at the lower end where it passes freely through a nipple 41. The upper end of tube 33 vents to the atmosphere.

At the upper end the tube 39 carries a valve seat or release port 43 upon which a steel ball check 45 tends to rest. At its lower end the tube 39 is attached to a piston rod 47 extending from a piston 49. The piston rod 47 has a free sliding fit in a cylinder 51 which is carried upon the nipple 41. A passage 53 in the piston rod 47 forms the communication between the tube 39 and the space 52 above the piston 49. This space is enclosed by the cylinder 55 (in which the piston 49 operates) and a head 57 on said cylinder 55. A gauge 59 registers pressure in the space 52 above the piston 49. Pressure is introduced into this space through a branch line 61 leading from a main air line 63. In the air line 63 is a pressure regulator and filter unit 65. The branch line 61 feeds the cylinders through an adjustable needle valve 67 which acts as a throttle.

The piston 49 is biased downward by pressure above it. This bias at some point is equilibrated by means of a compression spring 69 reacting below the piston from an opposite enclosing head 71.

Returning to the float 19, it will be seen to comprise an imbedded permanent magnet 72, for example of the Alnico variety. Since the ball 45 is magnetic, any movement of the magnet 72, as determined by change in flow through the meter, tends to move with it the ball 13 up or down in the tube 33. Thus if the float 19 rises in response to increased flow, the ball 45 which is raised by the magnet 72 moves away from the seat 43 at the upper end of the tube 39. In uncovering the part 43 the air pressure above the piston 49 decreases because the increased leakage out of said tube 39 occurs faster than air is admitted through the restriction at needle valve 67. The resulting decreased air pressure above the piston 49, assisted by the spring 69, causes piston 49 to rise, carrying with it the tube 39 until the new position of the ball 45 is overtaken by the seat 43. Equilibrium will then again be reached when the ball 45 and the seat 43 are separated by a very thin film of continuously escaping air which finally escapes from the upper end of tube 33. Equilibrium will then also be established between the amount of vented air and the air supplied through the restriction at 67.

Figure 4:
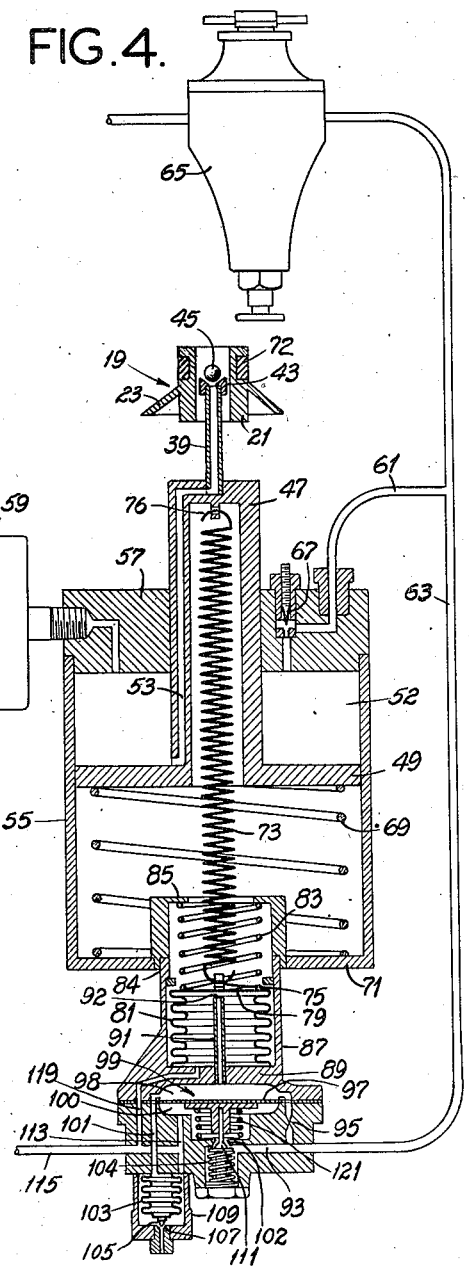
Fig. 4 is an enlarged schematic layout of the invention.

Conversely, upon a decreased rate of flow through the tube 11, float 19 descends and the magnet 72 forces the ball 45 toward the seat 43. This causes the air pressure above piston 49 to rise, thus pushing down the piston 49 and tube 39 until equilibrium is re-established between the amount of vented air and the air supplied which in turn equilibrates tube 39 with respect to the ball 45. Thus it will be seen that for each position of the float 18, there is a corresponding position for the piston 49, because the port 43 always comes to rest in the same relative position with respect to the float 19 through the action of the magnet 72 and ball 45. Thus each rate of flow determines a new position of the float 19 which is unimpaired by any coupled mechanism. Since the tube 39 always takes up the same relative position with respect to the float there will occur a corresponding definite position of the piston 49. It is the intention to apply the force required to bring the piston into equilibrium to a pilot valve of a remote control air line. This is done by means of a long tension spring 73 which is hooked at its upper end in a hollow part 76 of the piston rod 47. This spring is hooked at its lower end to a clevis 75 attached to a transmission link 77. The link 77 is fastened to the upper enclosing head or diaphragm 79 of a flexible bellows 81. This head 79 is biased downward by means of a spring 83 reacting at its upper end against a fixed ring 85. The ring 85 is fixed on the upper end of a casing 87 which has an adjustable thread attachment 84 to the head 71 of cylinder 55. The bellows 81 is sealed to the separating wall 89 which forms a part of the lower end of this housing (Fig. 4). A bleeder tube 91 extends through the wall 89 and has its upper open end closely adjacent to the under side of the diaphragm 79. Thus diaphragm 79, which is under control of spring 73, acts as variable throttling means for any air flowing out of the tube 91.

The portion of the casing 87 below the wall 89 constitutes a diaphragm type regulating pilot valve for controlling air pressure in an air line 115 leading to a receiving recording indicator 117. Filtered and regulated air is brought to this valve over line 63 and into a port 93. Some of this supply flows through a fixed restriction 95 to the top of a diaphragm 97. The diaphragm chamber is indexed as a whole at 99. The top part 98 of this chamber 99 (above the diaphragm 97) communicates via passage 101 with the inside of a flexible bellows 103 fastened to the bottom of casing 87. On the end of the flexible bellows 103 is a bleeder valve 105 cooperating with a bleeder port 107, the latter being in a compartment 109, also fastened to the bottom of casing 87 and surrounding the bellows 103.

Part of the air supplied from pipe 63 passes through port 102 to the lower section 100 of the diaphragm chamber below the diaphragm 97. Valve 111 which controls port 102 is attached to the diaphragm 97. Valve 111 is biased shut by a follower spring 104. The diaphragm 97 is biased up by a spring 121. When the diaphragm rises valve 111 closes and vice versa.

The chamber 100 beneath the diaphragm 97 is also in communication with the inside of the compartment 109, which is to say, outside-of-the bellows 103. The connection is shown at 113. This connection 113 also communicates with an air line 115 which transmits pressure to a recording indicator 117. As indicated in Fig. 2 this is of the recording type, although a non-recording type may also be used. There is also a communication 119 between the line 115 and the inside of the bellows 81. The receiving recording indicator 117 has a clock-driven paper-scale and its recording pen 121 responds to variations in pressure in the line 115.

The force in the tension spring 73, (as determined by its deflection caused by movement of piston 49) is applied to the diaphragm 79. This will hereinafter be referred to as the variable to be measured. This variable being proportional to the displacement of the piston 49, is hence proportional to the displacement of the float 19. It should be noted at this point that the spring 73 is made as long as possible so that it has a linear characteristic relationship between force and deflection.

Referring to Figs. 2 and 3 the left-hand pressure gauge 58 registers the air supply pressure entering the regulator and filter 65. It may be between 35 and 125 p. s. i. depending upon a user's supply pressure. The middle pressure gauge 60 indicates the regulated air pressure entering pipes 61 and 63. This pressure is arbitrarily made 17 p. s. i., for example. The right-hand pressure gauge 62 shows the transmitted air pressure in line 115. This gauge eliminates the necessity for observing the recorder 117 (which is located at a remote point) when setting the device to zero adjustment. The gauges 58, 60 and 62 are not shown in the diagrammatic Fig. 4.

Operation of the transmitter regulating pilot elements is as follows:

Filtered and regulated air flows from the supply pipe 63 and port 93 through the fixed restriction 95 to the top of the diaphragm 97 and then out through passage 101 to the inside of the bellows 103, thus controlling the automatic bleed valve 105. Bellows 103 being of metallic spring type has a contractive bias toward an open condition of the valve 105. For weaker bellows 103 an auxiliary spring can be used beneath it, biasing it in a direction to open the valve 105. Some also flows out of orifice 92 at the end of pipe 91. Some supply is also admitted through the valve 111 to the underside of the diaphragm 97. This air through connection 113 communicates with the inside of the chamber 109 (outside of the bellows 103), and also connects with the receiving meter 117 through line 115. It also passes in part to bellows 81 through passage 119.

When the piston 49 descends, the tension in spring 73 decreases proportionally. This is detected at the orifice 92 of the pipe 91 because of the closing action of the diaphragm head 79 under spring 83. This causes pressure to increase on the upper side of the diaphragm 97 and at the same time tends to close the automatic bleed valve 105. Air is also admitted through the then opened pilot valve 111 to the bottom of diaphragm 97 and outside of the bellows 103. The air admitted under diaphragm 97 equilibrates it in its original position. It also equilibrates the valve 105.

Conversely, if the piston 49 rises, more force is exerted by spring 73 tending to lift the bellows end 79. Pressure on the top of diaphragm 97 is thus reduced and at the same time the automatic bleed valve 105 is biased open to discharge more air from beneath the diaphargm 97 until a balance is again reached. The bellows end 79 in each case comes to rest at approximately the same distance as it was originally from the end of the tube 91. Variable pressure is thus transmitted to the receiving meter and the regulator after each change equilibrates itself ready for the next activity.

It will be noted that the pressure on the top of the diaphragm 97 is always higher than that on the underside by the amount of force exerted by the loading spring 121 and spring 104. This produces a differential pressure across the nozzle 92 at the end of the tube 91. This differential is maintained throughout the entire range of transmitted pressures thus insuring a pneumatic balance at substantially the original positions of the regulator parts. The change in balance position of the bellows 81 between zero and full scale is less than .001 inch, thereby eliminating the effects of any non-linear characteristics of bellows 81. This insures a transmitted pressure which is always in direct proportion to or linear with the measured variable (force in spring 73).

From the above it will be seen that an increase in pressure on the top of bellows 79 tends to decrease the gap at nozzle 92, thereby building up air pressure inside of the pipe 91 and area 99 above the diaphragm 97. This action tends to shut off the bleeder valve 105 and open the pilot valve 111. The opening of the pilot valve increases the air pressure in the area 100 beneath diaphragm 97 and also the pressure outside of the bellows 103 and inside of bellows 81, thereby tending to restore the equilibrium which was upset by a change in pressure on the top of the bellows 79. When this equilibrium is re-established, pressure on top of the diaphragm 97 will be higher than the pressure below it by the amount of the pressure exerted by the springs 121 and 104. This differential pressure across bellows 103 is sufficient to cause valve 105 to remain very slightly off its seat. Thus when the pressure on the top of the bellows 79 incipiently increases, the bleeder valve 105 will incipiently move toward closed position. Conversely, if the pressure on top of the bellows 79 is decreased, the valve 105 incipiently opens. The adjustment between valve 105 and its seat 107 is such that when the said differential pressure between the inside and the outside of the bellows 103 exists, the valve 105 is still slightly open.

Another condition to be noted is that the overall length of the spring 83 remains about the same under all conditions (within plus or minus .0005 inch. Therefore any non-linear characteristics of this necessarily short spring introduce no appreciable error. The relationship, for example, between the expansion spring 83 and the tension spring 73 is such that when the piston 49 is at the top of its travel the algebraic sum of the forces of compression spring 83 and tension spring 73 is equal to two pounds times 1.55 (which is the effective area in inches of the bellows end 79). When the piston 49 is at the bottom of its travel, the algebraic sum of the forces of the expansion spring 83 and of the tension spring 73 is equal to fifteen pounds times 1.55.

The characteristics of the expansion spring 69 (beneath the piston 49) are such that when the piston is at the bottom of its travel the spring force is equal to fifteen pounds times the effective area of the piston (approximately 4.1 square inches). When the piston is at the top of its travel the spring pressure is equal to two pounds times the effective area of the piston. Any non-linear characteristics of the spring 69 have no effect, inasmuch as the steel ball 45 with its vent tube 39 will cause a rise or fall of the air pressure on top of the piston until the desired position of the vent tube 39 is reached. From this it is clear that any slight air leakage through the clearance between piston rod 47 and the extension 51 is immaterial as the air supply is continued until the vent tube 39 reaches its proper position with respect to the float 19. Stated otherwise, spring 69 which has a large deflection requires no linear characteristics. Spring 83 does not deflect enough to make a linear characteristic necessary in its case. Only spring 73 requires a substantially linear characteristic and provision has been made for making this very long so that such a linear characteristic is practicable to obtain.

The bellows 81 and diaphragm 79 thereof may be referred to as a member responsive to the variable to be measured. This responsive member 79 is only slightly movable to bring about transmission of the desired effect through pipe 115 to the recorder 117. It is therefore of importance that the displacement which it is desired to measure of the piston 49 be converted into pressure changes through the spring 73 for application to the responsive member 79, and that these pressures should be proportional to the piston displacement. This means that a spring such as 73 must be rather long in order to obtain a linear force-deflection relationship for that spring. Since any compression spring that is made long to accomplish this end is axially unstable, the spring 73 is provided as a tension spring which may be made as long as desired to obtain the stated effect without introduction of any axial instability.

In an exemplary embodiment of the invention the travel of the piston 49 is about 5 inches. The maximum range of movement of a float such as 19 is of the order of 20 inches. This means that the upper end of the tube 39 moves through a quarter of the maximum range of the float. By changing the length of the tube 39, any chosen quarter of the operating range of the float may be registered. For example, it may be desired to record the lower quarter of the float range in which case a shorter vent tube 39 would be employed. If it were desired to record the upper quarter of the range, a longer tube 39 would be employed. By selecting the proper length of tube 39 any quarter of the float range would be recorded. The reason for this is that the variations of the float in the example are not more than one quarter of the maximum float range, regardless of whether the rate of flow through the tube 11 is high or low. Obviously, if it were desired to record the entire range, then a stroke of equal length would need to be provided for the piston 49, it being understood that the device would need to be re-dimensioned for such a purpose. Or, other fractions of the total range might be responded to.

The device is economical because under equilibrium conditions the air consumption is less than .1 cubic foot of free air per minute, the ball 13 allowing a very thin film to pass out of the orifice at the top of the tube 39. Also with the receiver 117 located at several hundred feet distance from the transmitter and connected with ¼ inch inside diameter tubing, the lag between operation of the float 19 and of the indication on the transmitter 121 is not more than a few seconds. For shorter distances it is less.

One element of the invention is the means for obtaining exteriorly of the liquid compartment of the flow meter a measurable variable (position of piston 49) which changes in a direct linear proportion to the condition of a variable within the liquid chamber (position of the float 19). The same principle can be used in analogous apparatus, for example, for measuring the elevation of a liquid level float, the position of which depends not upon liquid flow (as herein) but upon buoyancy of a float which rides on a liquid surface. In such case the float has a specific gravity which is less than that of the liquid.

In view of the above it may be seen that the invention has applications broader than the application indicated by the specific device shown. For example, it may also be used to reproduce in a remote moving device a sequence of positions of any movable primary device such as in an orifice meter, area meter or the like. Also, the action of a flapper of a check valve or throttling valve in a chemical process may be remotely reproduced. The remotely moving device needs not be one that simply moves as an indicator but may be one that has operative purposes.

It will be understood that the tube 33 is preferably non-magnetic so that the normal form of the magnetic field as determined by the shape of the magnet 72 is not appreciably distorted and has its full effect upon the ball 45.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In apparatus of the class described, a fluid chamber, hollow means passing through the chamber and the fluid therein, a float, the elevation of which in the chamber is changed by the fluid and being movable along said hollow means, a tube in the hollow means and extending exteriorly therefrom and having an orifice normally adjacent to said float, a magnetic check valve associated with said orifice, a magnet on said float controlling the position of said valve with respect to said orifice, means for conveying air to said tube to exhaust at said orifice, and operating means for moving the tube which is responsive to the pressure of said air, said pressure being determined by the position of said valve in respect to the orifice.

2. In apparatus of the class described, a fluid chamber, hollow means passing through the chamber and the fluid therein, a float, the elevation of which in the chamber is changed by the fluid and being movable along said hollow means, a tube in the hollow means and extending exteriorly therefrom and having an orifice normally adjacent to said float, a magnetic check valve associated with said orifice, a magnet on said float controlling the position of said valve with respect to said orifice, substantially throttled means for conveying air to said tube to exhaust at said orifice, and operating means for moving the tube which is responsive to the pressure of said air as determined by the position of said valve in respect to the orifice.

3. A liquid flow meter comprising a vertically arranged downwardly tapering conical tube carrying a flow of liquid upward, a hollow guide passing coaxially through said tube, a float surrounding and sliding on said guide, a magnetic member carried by said float, a movable tube in said guide having an orifice adjacent the float, a magnetic valve biased by gravity toward seating over said orifice, a cylinder, a piston in said cylinder, said tube extending from said guide and being attached to said piston and having communication with the part of the cylinder above the piston, a spring biasing said piston upward, throttling means for admitting air to the cylinder above said piston for leakage from said orifice as determined by the position of said valve, an air operated indicating receiver, a fluid circuit connected with said receiver for operating it, means responsive to variable force for controlling said circuit, and resilient means for applying variable force to said responsive means in substantially direct proportion to the displacement of said piston.

4. A liquid flow meter comprising a vertically arranged downwardly tapering conical tube carrying a flow of liquid upward, a hollow guide passing coaxially through said tube, a float surrounding and sliding on said guide, a magnetic member carried by said float, a movable tube in said guide having an orifice adjacent the float, a magnetic valve biased by gravity toward seating over said orifice, a cylinder, a piston in said cylinder, said movable tube extending from said guide and being attached to said piston and having communication with the part of the cylinder above the piston, a spring biasing said piston upward, substantially throttling means for admitting air above said piston for gradual leakage from said orifice as determined by the position of said valve, an air operated indicating receiver, a fluid circuit connected with said receiver for operating it, means responsive to force for controlling said circuit, and resilient means for applying force to said responsive means in accordance with the displacement of said piston, said last-named means comprising an elongated tension spring connecting the piston with said responsive means.

5. In apparatus of the class described, a liquid chamber, a movable float in the chamber including a magnetic element, an air exhaust pipe having an orifice and along which pipe the float is movable, a magnetic valve member associated with said orifice adjacent which valve member said magnetic element is normally positioned, said exhaust pipe being freely movable and extending from the liquid chamber, a cylinder, a piston operating in said cylinder and being attached to and movable with said exhaust pipe, said exhaust pipe communicating with the cylinder, an air supply connection with said cylinder on the side of the piston with which said exhaust pipe communicates and applying pressure thereto, means for throttling said air supply to supply air at a rate which is less than the maximum rate at which air may exhaust from said orifice, and means biasing said piston and exhaust pipe against said pressure, whereby any incipient upward movement of the float causes said magnetic valve member incipiently to open and temporarily reduce air pressure above said piston so that the biasing means moves the exhaust pipe to a normal position of the orifice with respect to said valve member and whereby when said float moves in the opposite direction said magnetic valve member incipiently closes the orifice to effect rise in pressure on said piston whereby it and the exhaust pipe are moved against the biasing means until said orifice again takes up a normal position with respect to said magnetic valve member.

6. In apparatus of the class described, a liquid chamber, a movable float in the chamber including a magnetic element, an air exhaust pipe having an orifice and along which the float is movable, a magnetic valve member associated with said orifice adjacent which said magnetic element is normally positioned, said exhaust pipe being freely movable and extending from the liquid chamber, a cylinder, a piston operating in said cylinder, said piston being attached to and movable with said exhaust pipe, said exhaust pipe communicating with the cylinder above the piston, an air supply connection with said cylinder above the piston, means for throttling said air supply to supply air at a rate which is less than the maximum rate at which air may exhaust from said orifice, means biasing said piston and exhaust pipe upward whereby any incipient upward movement of the float causes said magnetic valve member incipiently to open and temporarily reduce air pressure above said piston so that the biasing means lifts the orifice to a normal position with respect to said valve member and whereby when said float descends said magnetic valve member incipiently closes the orifice to effect rise in pressure above said piston whereby it and the exhaust pipe are depressed against the biasing means until said orifice again takes up a normal position with respect to said magnetic valve member, a fluid operated measuring receiver, a fluid pipe extending thereto, pilot valve means connected with said fluid pipe and having a responsive member for actuating said pilot valve, said responsive member having only a slight degree of movement for substantial changes in force thereon, and spring means connecting said piston and said responsive member, said spring means having linear force-deflection characteristics whereby force is applied to said responsive member in proportion to the displacement of said piston.

7. In apparatus of the class described, a liquid chamber, a movable float in the chamber including a magnetic element, an air exhaust pipe having an orifice and along which pipe the float is movable, a magnetic valve member associated with said orifice adjacent which said magnetic element is normally positioned, said exhaust pipe being freely movable and extending from the liquid chamber, a cylinder, a piston operating in said cylinder being attached to and movable with said exhaust pipe, said exhaust pipe communicating with the cylinder above the piston, an air supply connection with said cylinder above the piston, means for throttling said air supply to supply air at a rate which is less than the maximum rate at which air may exhaust from said exhaust pipe, means biasing said piston and exhaust pipe upward, whereby any incipient upward movement of the float causes said magnetic valve member incipiently to open and temporarily reduce air pressure above said piston so that the biasing means lifts the orifice to a normal position with respect to said valve member, whereby when said float descends said magnetic valve member incipiently closes the orifice to effect rise in pressure above said piston whereby it and the exhaust pipe are depressed against the biasing means until said exhaust pipe again takes up a normal position with respect to said magnetic valve member, a fluid-operated measuring receiver, a fluid pipe extending thereto, pilot valve means connected with said fluid pipe and having a responsive member for actuating said pilot valve, said responsive member having only a slight degree of movement for substantial changes in force thereon, and spring means connecting said piston and said responsive member, said spring means having linear force-deflection characteristics whereby force is applied to said responsive member in proportion to the displacement of said piston, said spring member comprising a long tension spring.

8. A flow meter comprising a downwardly tapered conical chamber through which fluid flows upward, a fixed hollow pipe positioned coaxially with the chamber and having a vent at the top, a float movable to various elevations according to the amount of flow through the chamber, movement of said float being guided by said pipe and the float being around the pipe, a magnet carried by the float, a freely movable tube in said pipe and projecting from the lower end of said pipe, said movable tube having an exhaust orifice adjacent the float, a magnetic ball valve adjacent said seat and biased toward it by gravity, a cylinder supported coaxially below the chamber, a piston in said chamber, an elongate hollow piston rod on the piston, said movable tube being attached to said piston rod and communicating with the cylinder above the piston, a compression spring biasing the piston upward and reacting from the opposite end of the cylinder, measuring means on said opposite end of the cylinder, a tension spring extending from the upper end of said rod and through said hollow piston rod and being fastened at its other end to said measuring means for applying a force thereto proportional to displacement of said piston, throttled means for introducing a flow of air into said cylinder above the piston adapted to build up pressure above the piston when said valve approaches closure but otherwise to allow pressure reduction, whereby upward and downward movements of the float cause opening and closing movement respectively of said valve so as respectively to reduce or increase pressure on said piston and thereby respectively to cause said piston to rise or descend according to upward or downward movements respectively of said float, the piston and float movements being linearly proportional.

9. In apparatus of the class described, a chamber carrying fluid to be measured, a hollow means passing through the chamber and the fluid therein, a float, the elevation of which in the chamber is changed by the fluid and being movable along said hollow means, a tube in the hollow means and extending therefrom and having an orifice in the hollow means normally adjacent to said float, a magnetic check valve associated with said orifice, a magnet on said float controlling the position of said valve with respect to the orifice, throttling means for conveying air to said tube to exhaust at said orifice, piston operating means for moving the tube which is responsive to the pressure of said air, said pressure being determined by the temporary movement of said valve in respect to the orifice as determined by temporary float movement, whereby the operating means adjusts the tube to the valve to assume a normal position thereto, means responsive to a variable pressure for making an indication, and means connecting said piston and said responsive means comprising an elongate spring having substantially linear force-displacement characteristics and connecting said piston operating means with said responsive means.

10. In apparatus of the class described, a chamber carrying fluid to be measured, a hollow means passing through the chamber and the fluid therein, a float, the elevation of which in the chamber is changed by the fluid and being movable along said hollow means, a tube in the hollow means and extending therefrom and having an orifice in the hollow means normally adjacent to said float, a magnetic check valve associated with said orifice, a magnet on said float controlling the position of said valve with respect to the orifice, throttling means for conveying air to said tube to exhaust at said orifice, piston operating means for moving the tube which is responsive to the pressure of said air, said pressure being determined by the temporary movement of said valve in respect to the orifice as determined by temporary float movement, whereby the operating means adjusts the tube to the valve to assume a normal position, means responsive to a variable pressure for making an indication, and means connecting said piston and said responsive means comprising an elongate tension spring having substantially linear force-displacement characteristics and connecting said piston operating means with said responsive means.

11. In apparatus of the character described, a member movable to various positions, magnetic means movable therewith, a conduit mounted for movement following said member, one end of said conduit being disposed adjacent said magnetic means and having an orifice therein, a magnetic check valve member associated with said orifice, said check valve member being disposed within the magnetic field of said magnetic means, means for conveying air to said conduit to exhaust at said orifice, and operating means for moving the conduit which is responsive to the pressure of said air, said pressure being determined by the position of said check valve member in respect to the orifice.

12. In apparatus of the character described, a vertically movable member having a magnet thereon, a vertically movable tube having its upper end adjacent said magnet and having an orifice therein and a valve seat thereon, means for supplying air under pressure to said tube, a check valve member associated with said orifice and said valve seat, said check valve member comprising a ball of magnetic material gravity-biased toward said seat, said ball being disposed within the magnetic field of said magnet, said air exhausting through said orifice and its pressure being determined by the position of said ball with respect to the orifice and valve seat, and means for moving said tube to follow said movable member in response to variation of the pressure of air in said tube caused by movement of said ball relative to said tube in accordance with movement of said vertically movable member.

FOSTER M. POOLE.

REFERENCES CITED

The following references are of record in the file of this patent:

UNITED STATES PATENTS

| Number | Name | Date |
| --- | --- | --- |
| 2,311,853 | Moore | Feb. 23, 1943 |
| 2,131,486 | Spitzglass | Sept. 27, 1938 |
| 2,243,944 | Donaldson | June 3, 1941 |
| 2,056,177 | Erbguth | Oct. 6, 1936 |
| 2,352,312 | Donaldson | June 27, 1944 |
| Re. 14,206 | Gibson | Oct. 24, 1916 |
| 2,354,423 | Rosenberger | July 25, 1944 |
| 1,638,101 | Roucka | Aug. 9, 1927 |
| 2,351,745 | Donaldson | June 20, 1944 |
| 2,260,516 | Gerber | Oct. 28, 1941 |
| 2,312,201 | Thompson et al. | Feb. 23, 1943 |
| 2,380,399 | Bowie | July 31, 1945 |